United States Patent [19]

Alkaitis

[11] 4,244,938
[45] Jan. 13, 1981

[54] PREPARATION OF TRANSITION METAL HYDRATES BY DIRECT METAL REACTION

[75] Inventor: Anthony Alkaitis, Cleveland Heights, Ohio

[73] Assignee: Mooney Chemicals, Inc., Cleveland, Ohio

[21] Appl. No.: 962,127

[22] Filed: Nov. 20, 1978

[51] Int. Cl.$^3$ .................. C01G 51/04; C01G 53/04
[52] U.S. Cl. ......................... 423/592; 423/263; 423/607; 423/605; 423/608; 423/632
[58] Field of Search ........................... 423/592, 627

[56] References Cited

U.S. PATENT DOCUMENTS

| | | | |
|---|---|---|---|
| 2,602,070 | 7/1952 | Kirtpatrick | 423/592 |
| 2,958,581 | 11/1960 | Heweit et al. | 423/627 |
| 2,989,373 | 6/1961 | Llewelyn et al. | 423/592 |
| 3,429,660 | 2/1969 | Keith et al. | 423/627 |
| 4,053,578 | 10/1975 | Hill et al. | 423/592 |

FOREIGN PATENT DOCUMENTS

| | | | |
|---|---|---|---|
| 260989 | 9/1963 | Australia | 423/592 |
| 571405 | 2/1959 | Canada | 423/592 |
| 2142680 | 4/1973 | Fed. Rep. of Germany | 423/592 |

*Primary Examiner*—Herbert T. Carter
*Attorney, Agent, or Firm*—Maky, Renner, Otto & Boisselle

[57] ABSTRACT

Transition metal hydroxides of the first transitional series are prepared by reacting a transition metal with water, a nitrogen-containing compound, one or more aliphatic or alicyclic monocarboxylic acids containing at least eight carbon atoms and a diluent in the presence of oxygen. Only small amounts of the acid and nitrogen-containing compound are required. The reaction mixture also can contain dispersants. The method of the invention avoids the corrosion and pollution problems which are present in some prior art processes. The transition metal hydroxides prepared in accordance with the invention are free of salt contamination.

15 Claims, No Drawings

PREPARATION OF TRANSITION METAL HYDRATES BY DIRECT METAL REACTION

BACKGROUND OF THE INVENTION

Transitional metal hydroxides generally have been produced by adding an alkaline solution to a solution of a water soluble transition metal salt which results in the precipitation of the metal hydroxide. Metal hydroxides have been found to be useful in a variety of applications. For example, manganese hydroxide has been used as a pigment in the ceramic and refractories industries. Copper hydroxide and cobalt hydroxide have been used as pigments and in paints. Metal hydroxides also are useful as intermediates in the preparation of other metal compounds. For example, the transition metal hydroxides can be used as a starting material for preparing overbased and complex metal carboxylates containing varying amounts of the transition metal which are useful as lubricating oil additives, anti-knock agents for gasoline, fuel additive type combustion improvers, smoke or toxic fume suppressants, driers and ultraviolet co-catalysts for inks and coatings.

As mentioned above, the prior art method for preparing metal hydroxides such as the transition metal hydroxides involves the addition of an alkaline solution to a transition metal salt solution whereupon the transition metal hydroxide is precipitated with the formation of a new salt. The soluble transition metal salts include the chlorides, sulfates, nitrates and acetates. Alkaline solutions which have been utilized include sodium hydroxide, potassium hydroxide and ammonium hydroxide. In USSR 548,570, cobalt hydroxide is obtained by treating cobalt basic carbonate with sodium hydroxide. The use of the basic carbonate is reported to result in precipitation of the hydroxide at normal temperatures and with reduced contamination. An apple-green precipitate of nickel hydroxide is obtained when potassium or sodium hydroxide is added to a solution of a nickelous salt such as nickel nitrate or nickel ammonium nitrate.

One of the difficulties of the prior art method for preparing transition metal hydroxides is the concurrent formation of an alkali metal salt such as sodium chloride, potassium chloride, sodium sulfate, sodium nitrate, sodium acetate, etc., depending upon the anion present in the soluble transition metal salt. Accordingly, it has been difficult to prepare transition metal hydroxides which are free of alkali metal salt impurities. The prior art methods also are more costly since the initial metal salts must be prepared, often from corrosive chemicals such as nitric or sulfuric acids. Since the prior art method described above results in the formation of salts, there also is a disposal problem created.

SUMMARY OF THE INVENTION

This invention relates to a method of preparing transition metal hydroxides which comprises the steps of
(a) providing a mixture comprising
(i) one or more transition metals of the first transitional series,
(ii) water,
(iii) at least one nitrogen-containing compound selected from the group consisting essentially of ammonia, organic amines, or mixtures thereof,
(iv) one or more aliphatic or alicyclic monocarboxylic acids containing at least eight carbon atoms, and
(v) a diluent, and
(b) heating the mixture in the presence of oxygen for a period of time sufficient to form the insoluble transition metal hydroxide.

Excellent recoveries of the transition metal hydroxides are obtained by this method, and the rate of reaction generally is improved when additional amounts of ammonia are added during the heating step.

DESCRIPTION OF THE PREFERRED EMBODIMENTS

The present invention is concerned with a novel and simple method of preparing transition metal hydroxides of the first transitional series. The first step in the method of the invention involves the preparation of a mixture which comprises the transition metal, water, a nitrogen-containing compound, one or more aliphatic or alicyclic monocarboxylic acids containing at least eight carbon atoms and a diluent. Of the transitional elements found in the first transition series, namely, scandium, titanium, vanadium, chromium, manganese, iron, cobalt and nickel, cobalt, iron, manganese and nickel are preferred.

The aliphatic and alicyclic monocarboxylic acids which are included in the mixture used to form the metal hydroxides of the invention include acids containing at least eight carbon atoms in the molecule. Examples of these acids include 2-ethylhexanoic acid, commercially available standardized nonanoic acid, neodecanoic acid, oleic acid, stearic acid, naphthenic acid, tall oil acid and other natural and synthetic acids and acid mixtures. When the reaction mixture contains only one acid, it is preferred that the acid contain from about 8 to 10 carbon atoms such as found in the fatty acids. When more than one acid is used, the additional acids can include lower molecular weight acids such as formic, acetic, propionic and butyric acids.

The reaction mixture also must contain at least one nitrogen-containing compound selected from the group consisting essentially of ammonia, organic amines or mixtures thereof. Ammonia generally is added as ammonium hydroxide. Although only a small amount of ammonia is required for the reaction, the reaction is facilitated by the incremental addition of ammonia during the heating step. Similarly only a small amount of organic amine is required to initiate and promote the reaction, and the reaction is promoted further by the addition of ammonia during the heating step.

The organic amines useful in the invention can be aliphatic or aromatic amines and polyamines. Preferably the aliphatic amine will contain from about 10 to 30 carbon atoms, and mixtures of aliphatic amines are useful. For example, two commercially available aliphatic amine mixtures are Primene 81R which is a mixture of $C_{12}$ and $C_{14}$ aliphatic amines, and Primene JM-T which is a mixture of $C_{18}$ and $C_{20}$ aliphatic amines. Both of these materials are available under these trade designations from Rohm and Haas Co. Among the aromatic amines found to be useful is ortho-phenetidene and N,N' substituted p-phenylene diamines such as those having the formula

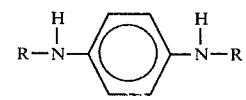

wherein each R is independently an alkyl group containing up to 10 carbon atoms. One example of such a compound is Santoflex 77 available from Monsanto Co. wherein each R group is a 1,4-dimethylpentyl group.

The reaction mixture also contains a non-reactive diluent which preferably is mineral spirits, mineral oil, synthetic oil or mixtures thereof.

The mixture which is prepared in the first step of the method of the invention will contain water in excess of that required to react with the transition metal to form the transition metal hydroxide. The amount of nitrogen-containing compound and aliphatic or alicyclic monocarboxylic acid present in the mixture may vary over a wide range although it is unnecessary to include large amounts of these compounds in the mixture which merely adds to the expense of the process. Generally, the amount of monocarboxylic acid or acids is kept at a minimum being present in an amount which is effective to promote the desired reaction. Incorporation of at least about 0.075 mole of the monocarboxylic acid or acids have been found to provide satisfactory results, and a mole content of acid or acids of from about 0.1 to 0.2 moles appears to be preferred. The mole ratio of water to transition metal or transition metal oxide in the mixture generally is at least about 1.5 to 1 and preferably at least about 2:1. The amount of ammonia or nitrogen compound generally should be sufficient to provide one equivalent per acid equivalent and the ratio of equivalent of nitrogen (N-H basis) to acid preferably is at least about 1.25:1.

The mixture of transition metal, water, monocarboxylic acid, nitrogen-containing compound and diluent obtained in the first step of the method of the invention is heated and maintained at an elevated temperature in the presence of oxygen for a period of time sufficient to form the insoluble transition metal hydroxide. Generally, the reaction mixture is maintained at an elevated temperature such as from about 60° to 100° C., and more preferably at about 80°-90° C. for a period from about 3 or 4 to about 40 or 50 hours which results in the production of the transition metal hydrate in satisfactory yield. Higher temperatures may be employed when the reaction is conducted under elevated pressure.

As mentioned above, the transition metal hydroxide formed in accordance with the method of the invention is insoluble in the reaction medium thus enabling the recovery of the insoluble metal hydroxide by settling or filtration. Alternatively, the metal hydroxides can be recovered by removing the free water and diluent either by spray drying, distillation or evaporation.

Unreacted transition metals which may be present in the transition metal hydroxides prepared in accordance with the method of the invention can be removed by applying a magnetic field to the suspension of insoluble transition metal hydroxide or to the transition metal hydroxide after it is recovered from the free water and diluent. Alternatively, the unreacted metal powder or a majority of the powder can be separated by allowing the heavier unreacted powder preferentially to settle from the suspension and removing the precipitate from the suspended hydroxide. Combinations of these procedures also have been successful.

In the initial mixture provided in the first step of the reaction, other materials may be used for various ancillary purposes, for example, to serve as dispersing agents, to produce dispersing agent for other reactants or to modify the particle size of the transition metal hydrate. Hydrazine can be included to reduce especially manganese initially present in higher than the manganous state. Polyols or alkoxyalkanols can be added as promoters or to reduce the viscosity of the reactive mixture. In some instances, acids such as formic, acetic or hydrochloric acid can be included as promoters. There may be employed according to conventional practice, viscosity modifiers such as glycols, alcohol ethers or glycol ethers, amines, phosphate esters, etc.

The following examples illustrate the general procedure for preparing the metal hydroxides in accordance with the method of the invention. Unless otherwise indicated, all parts and percentages are by weight.

EXAMPLE 1

A mixture of 19 g. of crude neodecanoic acid, 300 g. of water, 1900 g, of cobalt metal, 2000 g. of mineral spirits, 7.5 g. of "Triton X-15" (octylphenoxy polyethoxy ethanol from Rohm & Haas Company) and 7.5 g. of "Santoflex 77" (N,N'-substituted p-phenylene diamine from Monsanto) is prepared in a 5 liter flask equipped with reflux condenser. Air is bubbled through the mixture at the rate of about 4 cubic feet per hour (cfh). Ammonium hydroxide (18 g.) is added to the mixture which is heated to a temperature of about 82° C. over a period of about 2 hours and maintained at a temperature of between about 82° and 88° C. for a period of about 6 hours while periodically adding water (400 g. total), mineral spirits (500 g. total) and 10 g. of ammonium hydroxide. The mixture is stirred overnight without heat. On the following day, 100 g. of water, 5 g. of ammonium hydroxide and 300 g. of mineral spirits are added to the mixture which is then heated to a temperature of 90° and maintained at a temperature between 80° and 90° C. for about 9 hours while periodically adding water (250 g. total), ammonium hydroxide (22 g. total) and 100 g. of mineral spirits. After stirring overnight without heat, 300 g. of mineral spirits and 200 g. of water are added to the mixture which is heated to a temperature of about 78°-82° C. and maintained at this temperature for 7 hours. The total heating time in this example is 52 hours, and air is bubbled through the reaction mixture during the entire reaction period at a rate of about 4-5 cfh.

The unreacted cobalt is extracted with a magnet, and the residue is centrifuged to remove any unreacted cobalt not removed by the magnet. A total of 440 g. of cobalt metal is retrieved in this manner indicating that 1460 g. of cobalt reacted. The cobalt hydrate obtained in this manner weighed 2280 g. and had a cobalt content of 63.59%.

EXAMPLE 2

The procedure of Example 1 is repeated with the following exceptions: The mixture contains 19 g. of crude neodecanoic acid; the amount of water added to the reaction mixture during the heating process is 650 g. total; the total amount of ammonium hydroxide added to the mixture is 51 g.; and the reaction mixture is heated to a temperature of about 80°-90° C. for a period of about 32 hours. The cobalt hydrate obtained in this example weighed 2300 g. and had a cobalt content of 62.98%.

EXAMPLE 3

A mixture of 1750 g. of cobalt metal powder, 1600 g. of mineral spirits, 180 g. of water, 10 g. of "Santoflex 77", 21 g. of crude neodecanoic acid, 17.4 g. of stearic acid and 2.3 g. of propionic acid is prepared and air is bubbled through the mixture. Ammonium hydroxide (24 g.) is added to the mixture which is heated to a temperature of about 80°–87° C. and maintained at this temperature for a period of about 8 hours. Water (about 400 g. total) and mineral spirits (about 500 g. total) is added periodically to the reaction mixture along with 20 g. of ammonium hydroxide. The reaction mixture is stirred overnight without heat, and is then heated to and maintained at a temperature of 80°–84° C. with the periodic addition of water (200 g. total), mineral spirits (400 g. total) and 20 g. of ammonium hydroxide. After a total of about 34 hours, the mixture is cooled, and 100 g. of unreacted cobalt metal is recovered. The cobalt hydroxide is dried in an oven at about 80°–90° C. resulting in the recovery of 2510 g. of dried cobalt hydroxide containing 63.4% of cobalt.

EXAMPLE 4

The procedure of Example 3 is repeated, except that 12.5 g. of "Triton X-15" is included in the reaction mixture and a total of 650 g. of water is added to the reaction mixture during the heating process. A yield of 2560 g. of dried cobalt hydroxide is recovered which contains 62.89% cobalt.

EXAMPLE 5

The procedure of Example 4 is repeated, except that the reaction mixture contains 1.8 g. of propionic acid, 13.0 g. of stearic acid and 15.7 g. of crude neodecanoic acid, only 7.5 g. of "Triton X-15" and 7.5 g. of "Santoflex 77".

The amount of unreacted cobalt metal recovered from the reaction mixture is 250 g. indicating that 1500 g. of cobalt reacted. A yield of 2380 g. of dried cobalt hydroxide is recovered which contains 63.06% cobalt.

EXAMPLE 6

The procedure of Example 5 is repeated, except that the amount of acids contained in the mixture is reduced from 0.15 mole to 0.10 mole, and the acid mixture contains 1.2 g. of propionic acid, 8.7 g. of stearic acid, and 10.5 g. of crude neodecanoic acid. Also, a total of 1000 g. of water and 84 g. of ammonium hydroxide are added during the heating process.

About 690 g. of unreacted cobalt is recovered from the reaction mixture. A yield of 1690 g. of dried cobalt hydroxide having an analysis of 62.85% cobalt is obtained.

EXAMPLE 7

The procedure of Example 5 is repeated, except that the mixture of acids comprises 1.1 g. of propionic acid, 13.0 g. of stearic acid and 17.1 g. of crude neodecanoic acid, 2000 g. of mineral spirits and 300 g. of water are included in the original mixture, and a total of 1000 g. of water and 79 g. of ammonia hydroxide are added during the heating process.

A yield of 2400 g. of dried cobalt hydroxide having an analysis of 63.13% cobalt is obtained.

EXAMPLE 8

The procedure of Example 1 is repeated, except that the reaction mixture comprises 1000 g. of cobalt powder, 1400 g. of mineral spirits, 250 g. of water, 158 g. of crude neodecanoic acid, 64 g. of stearic acid, 34 g. of propionic acid and 41 g. of "Triton X-35" (octylphenoxy polyethoxy ethanol from Rohm & Haas Company). Ammonium hydroxide (100 g.) is added to the mixture which is heated to a temperature of about 78°–83° C. and maintained at this temperature for about 29 hours with the periodic addition of a total of 600 g. of mineral spirits, 150 g. of water and 80 g. of ammonium hydroxide. Cobalt hydroxide containing 62.0% cobalt is produced.

EXAMPLE 9

A mixture of 750 g. of nickel powder, 500 g. of oil, 1300 g. of mineral spirits, 350 g. of water, 55 g. of 2-ethylhexoic acid, 22 g. of crude neodecanoic acid, 33 g. of stearic acid, 11 g. of propionic acid, 5 g. of potassium iodide and 38 g. of "Triton X-15" is prepared and 68 g. of ammonium hydroxide is added. Air is bubbled through the mixture at a rate of about 4 cfh and the mixture is heated to about 80°–88° C. and maintained at this temperature for about 23 hours. A light green precipitate of nickel hydroxide is produced.

EXAMPLE 10

A mixture of 15 parts of neodecanoic acid, 3 parts of "Triton X-15", 3 parts of "Santoflex 77", 1200 parts of mineral spirits, 250 parts of water and 450 parts of cobalt powder is prepared. Ammonia (12 parts) is added to the mixture which is then heated to a temperature of about 75°–85° C. while air is bubbled through the mixture. The reaction mixture is maintained at this temperature of about 75°–85° C. for a total of about 54 hours with periodic addition of ammonia:water mixtures providing an additional 8 parts of ammonia and 120 parts of water. Mineral spirits also are periodically added to the reacting mixture in a total amount of 400 parts. At the end of the reaction period, the air is replaced by a nitrogen atmosphere and the reaction mixture is heated to a temperature of about 95° C. and maintained at this temperature for about 1 hours. The cobalt hydrate formed in this manner is allowed to settle and is recovered from the free water and mineral spirits.

EXAMPLE 11

The procedure of Example 1 is repeated except that the cobalt metal powder is replaced by an equivalent amount of manganese metal powder.

EXAMPLE 12

A mixture of 11.3 g. of crude neodecanoic acid, 2.9 g. of stearic acid, 2.3 g. of propionic acid, 7.5 g. of "Triton X-15", 7.6 g. of "Santoflex 77", 15 g. of butanol, 300 g. of water, 2100 g. of mineral spirits and 1500 g. of cobalt powder is prepared in a flask equipped with a reflux condenser. Air is bubbled through the mixture at a rate of about 5 cfh, and 18 g. of ammonium hydroxide are added to the mixture which is heated to a temperature of about 68° C. in one hour. The mixture is maintained within a temperature range of from about 68° C. to about 88° C. for a total of about 52 hours while periodically adding mineral spirits (550 g. total), water (550 g. total) and ammonium hydroxide (19 g. total).

The temperature of the reaction mixture is raised to about 100° C. whereupon water is removed by distillation. Unreacted cobalt is recovered (15 g.) indicating that 1485 g. of cobalt have reacted. The cobalt hydrate obtained in this manner has a cobalt content of 62.24%.

EXAMPLE B 13

The procedure of Example 12 is repeated except that the reaction mixture contains 15 g. of "Santoflex 77"

and no "Triton X-15". A yield of 2348 g. of cobalt hydrate is obtained containing 62.52% cobalt.

EXAMPLE 14

A mixture of 11.3 g. of neodecanoic acid, 2.9 g. of stearic acid, 2.3 g. of propionic acid, 39 g. of "Santoflex 77", 300 g. of water, 2100 g. of mineral spirits and 1000 g. of cobalt powder is prepared, and air is bubbled through the mixture at a rate of about 4–5 cfh. The mixture is heated to and maintained at a temperature within the range of about 75°–90° C. over a period of about 45 hours while periodically adding water (750 g. total) and mineral spirits (300 g. total). Cobalt powder (500 g.) is added to the mixture at the end of about 5 hours. After dehydration of the mixture the residue is pink in color. A yield of 2217 g. of cobalt hydrate is obtained having a cobalt content of 62.21%.

EXAMPLE 15

The procedure of Example 14 is repeated except that the "Santoflex 77" is replaced by 11 g. of ortho-phenetidene (ortho-ethoxyaniline). A yield of 2344 g. of cobalt hydrate is obtained having a cobalt content of 62.66%.

EXAMPLE 16

The procedure of Example 14 is repeated except that the "Santoflex 77" is replaced by an equivalent amount of "Primene 81R".

EXAMPLE 17

The procedure of Example 14 is repeated except that the "Santoflex 77" is replaced by an equivalent amount of "Primene JM-T".

The transition metal hydrates, and particularly the cobalt hydrate prepared in accordance with the procedure of this invention, are hydrophobic. Accordingly, the hydrates of the invention are conveniently used in preparing metal soaps.

The embodiments of the invention in which an exclusive property or privilege is claimed are defined as follows:

1. A method of preparing cobalt and nickel hydroxides which comprises the steps of
   (a) providing a mixture comprising
      (i) cobalt or nickel metal,
      (ii) water,
      (iii) a nitrogen-containing compound selected from the group consisting essentially of ammonia, organic amines, or mixtures thereof,
      (iv) one or more aliphatic or alicyclic monocarboxylic acids at least one of which contains at least eight carbon atoms, and
      (v) a diluent, and
   (b) heating the mixture in the presence of oxygen for a period of time sufficient to form the insoluble metal hydroxide.

2. The method of claim 1 wherein the nitrogen compound is ammonia and the amount of ammonia contained in the mixture is at least sufficient to neutralize the one or more carboxylic acids contained in the mixture.

3. The method of claim 2 wherein additional ammonia is added to the mixture during the heating step (b).

4. The method of claim 1 wherein the mixture contains at least one aliphatic acid containing from 8 to 10 carbon atoms.

5. The method of claim 1 wherein the nitrogen-containing compound in the mixture is an aliphatic amine or mixture of amines, containing from 10 to 30 carbon atoms.

6. The method of claim 1 wherein the nitrogen-containing compound in the mixture is an aromatic compound.

7. The method of claim 1 wherein the nitrogen-containing compound in the mixture is a mixture of ammonia and an aromatic amine.

8. The method of claim 1 wherein the insoluble metal-hydroxide formed in step (b) is recovered from the free water and diluent.

9. The method of claim 1 wherein the mixture provided in step (a) also contains a dispersant.

10. The method of claim 1 wherein the metal is cobalt.

11. The method of claim 1 wherein the mixture is heated in step (b) at a temperature of from about 60° to about 100° C.

12. The method of claim 1 wherein the water is removed from the mixture upon completion of the heating step (b) to provide a slurry of the insoluble metal-hydroxide in the diluent.

13. A method of preparing cobalt and nickel hydroxides which comprises the steps of
   (a) providing a mixture comprising
      (i) cobalt or nickel metal,
      (ii) water,
      (iii) ammonia or ammonium hydroxide,
      (iv) one or more aliphatic or alicyclic monocarboxylic acids, at least one of which contains at least eight carbon atoms, and
      (v) a diluent, and
   (b) heating the mixture in the presence of oxygen for a period of time sufficient to form the insoluble metal hydroxide.

14. The process of claim 13 wherein additional ammonia or ammonium hydroxide is added to themixture during the heating step.

15. The method of claim 12 wherein the metal is cobalt.

* * * * *